United States Patent [19]

Stahl

[11] 4,083,739

[45] Apr. 11, 1978

[54] FABRICATED PARTS AND METHOD AND APPARATUS FOR PRODUCING THE SAME

[75] Inventor: Lloyd E. Stahl, Monroe, Mich.

[73] Assignee: Woodall Industries Inc., Detroit, Mich.

[21] Appl. No.: 674,883

[22] Filed: Apr. 8, 1976

[51] Int. Cl.$^2$ .......................... B26D 3/00; B32B 31/00

[52] U.S. Cl. .................................... 156/163; 156/254; 156/256; 83/1; 83/4; 83/176; 83/452

[58] Field of Search ................... 83/1, 4, 19, 176, 452; 156/163, 254, 256

[56] References Cited

U.S. PATENT DOCUMENTS

| | | | |
|---|---|---|---|
| 1,786,542 | 12/1930 | MacDonald | 83/1 |
| 2,221,436 | 11/1940 | Remington | 83/176 X |
| 2,660,217 | 11/1953 | Lawson | 156/257 X |
| 3,186,271 | 6/1965 | Kaiser | 83/19 X |
| 3,549,449 | 12/1970 | Windecker | 156/254 |
| 3,695,128 | 10/1972 | Gentile | 83/176 X |
| 4,008,551 | 2/1977 | MacDonald et al. | 156/257 X |

*Primary Examiner*—J. M. Meister
*Attorney, Agent, or Firm*—Collins, Oberlin & Darr

[57] ABSTRACT

Automotive trim parts in sheet form with thinned marginal and inner areas, fabricated by a special skiving and assembling system that utilizes a combined skiving and assembly fixture.

2 Claims, 15 Drawing Figures

FABRICATED PARTS AND METHOD AND APPARATUS FOR PRODUCING THE SAME

BACKGROUND

1. Field of the Invention

The present invention relates broadly to shaped and fabricated parts, and to a method and apparatus for producing such parts. More particularly, it has to do with articles that consist of or include a layer of relatively thick flexible sheet material that has been shaped by cutting or shaving away predetermined portions thereof, with a method of fabricating such articles that involves a particular skiving procedure, and with apparatus for performing the method that includes a special holding fixture.

2. Description of the Prior Art

In the past it has been customary to provide trim materials for automobiles in the form of quite thin sheets, so that the edges of these sheet materials could be slid into or under, and pinched or otherwise held in, moldings, window frames and the like, or be buttoned onto trim moldings.

SUMMARY

According to the present invention, however, there are provided automotive trim and lining parts in sheet form that have the advantage of incorporating a relative heavy insulating or padding layer, such as acoustical plastic foam or other lightweight permeable material, of as much as one inch or more in thickness, without its being necessary to discard or redesign the currently used automotive trim moldings in order to install them.

Briefly stated this is accomplished by thinning the margins of the relatively thick insulating sheet or layer and, at the same time, removing any other portions thereof that, for appearance or mechanical reasons, it may be desired to remove in order to accommodate pressure areas, or to shape the layer to a predetermined contour; and by doing this by a skiving operation that is performed while the flexible layer is positioned by, and retained in contact with, a holding fixture.

Accordingly, it is an important object of the invention to provide a relatively thick sheet-like trim or lining of a special shape, including thinned marginal and/or other designated areas, and designed to meet specific contour requirements.

Another object is the provision, by reasons of incorporating such a part or article, of improved insulating and crash resisting properties in automobiles, along with increased head room, softness, pleasing hand feel, and concealment of necessary reinforcements, mounting brackets, and the like.

Another object is to provide parts of this general character and usable for these purposes that, even in large sizes, can be readily introduced through a door or window of an automobile, then unfolded inside the car, and quickly inserted into coves and side rails, over doors or headers, and into large flat areas over rear windows, and other difficult to reach and cover areas.

Another object is the provision of a skiving system capable of producing parts and articles of the above character by a cutting or shaving procedure.

Another object is to provide apparatus usable in skiving and/or in otherwise fabricating and producing such articles.

Further objects and advantages will become apparent in the course of the following description, when taken in connection with the accompanying drawings.

BRIEF DESCRIPTION OF THE DRAWINGS

In the drawings, wherein like numerals are employed to designate like parts throughout.

DESCRIPTION OF ILLUSTRATIVE EMBODIMENTS

Figure 1:
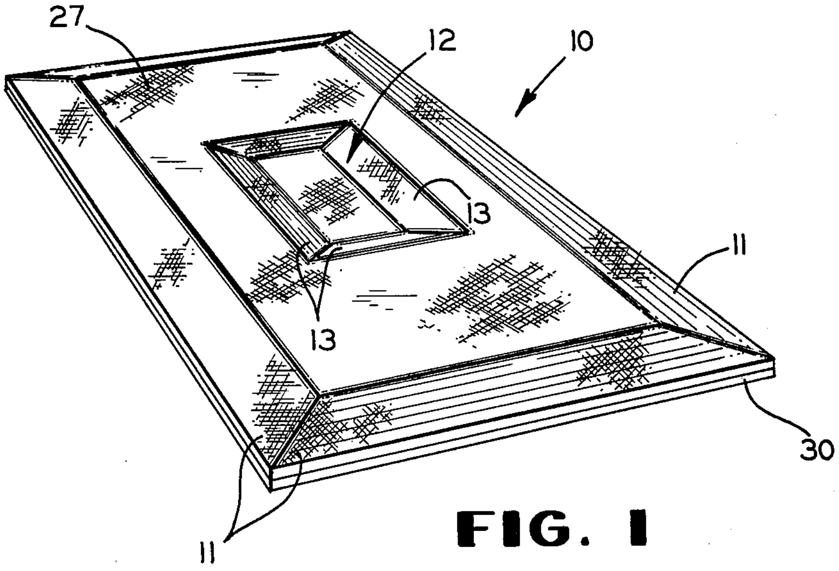
FIG. 1 is a perspective view of an automotive trim part that is exemplary of one type of article contemplated by the invention.
Figure 2:
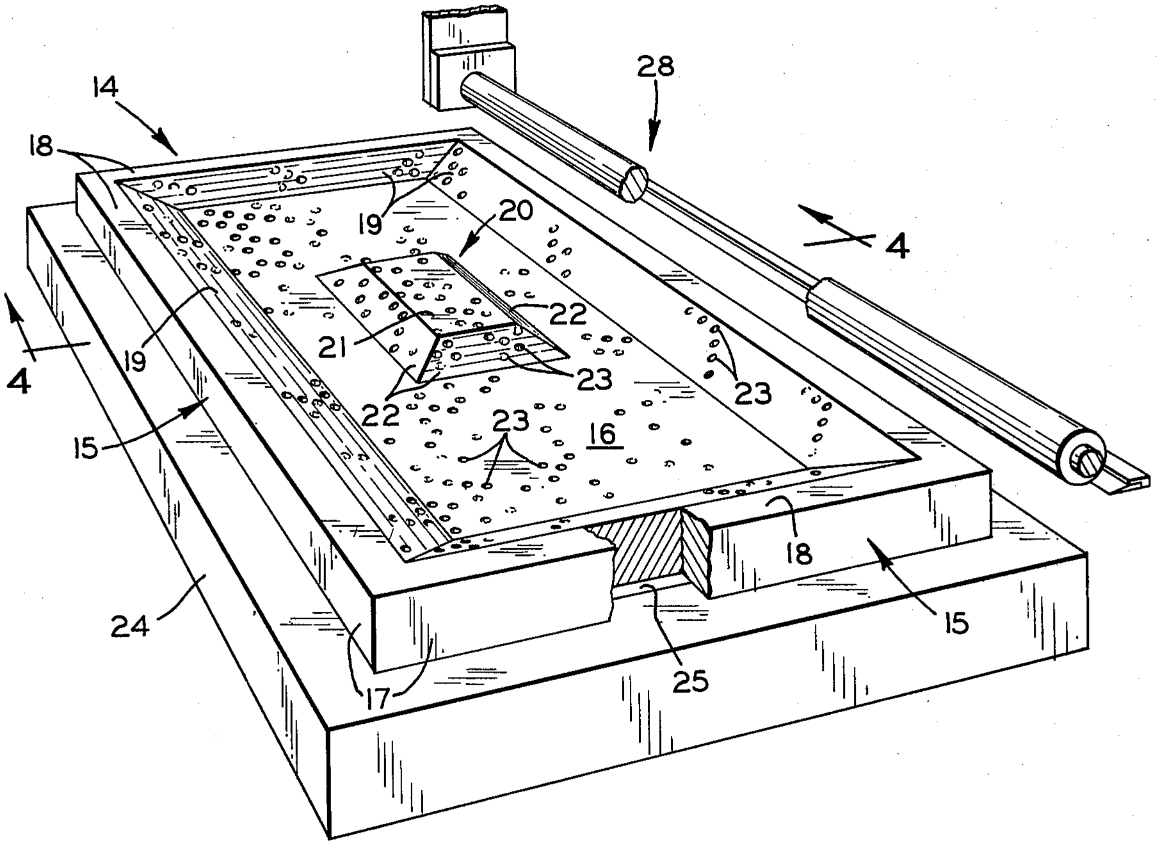
FIG. 2 is a perspective view of an apparatus that can be employed in fabricating the trim part shown in FIG. 1.

Referring now more particularly to the drawings, there is illustrated in FIG. 2 a preferred form of apparatus for use in producing the finished trim part 10 as shown in FIG. 1 and which is specifically for an automobile.

Among the important features in the shape of the part 10 are the angularly thinned or gradually tapering marginal portions 11 which permit the edges of this relatively thick sheet-like part to be received by and secured within a relatively thin metal or plastic channel or molding; and the thinned central area 12, with its decoratively tapered sides 13, that can answer an esthetic or a utilitarian purpose with equal facility.

To produce such an article in accordance with the present invention there is provided, as best shown in FIG. 2, a skiving or holding fixture 14 which may be in the form of a rectangular, open box type structure having four sides 15, rising from a bottom 16 and each of which sides is made up of a vertical outside wall 17, a horizontal upper edge 18, and an inside wall 19 that slopes downwardly and inwardly from the edge 18 to the bottom 16. Centrally of the bottom 16 there rises a generally rectangular protrusion 20 having a flat top 21 and four side walls 22 each of which slopes downwardly and outwardly from the top 21 to the bottom 16.

Also the bottom 16 is provided with a plurality of relatively small, vertically disposed passageways 23 extending therethrough and uniformly distributed to open, not only throughout the horizontal upper face of the bottom 16, but also throughout the upper faces of the sloping inside walls 19, and of the side walls 22 and top 21 of the protrusion 20. The fixture 14 can be made of wood where material economy, make-up time, handling ease and light weight are of importance; or of metal where greater precision is a factor; and, to render it usable for its intended purpose, it is mounted on a suitable base, framework or carriage, such as shown at 24, and which is provided with a suitable vacuum or exhaust chamber 25 connected to adequate air exhaust means and controls (not shown).

Figure 3:
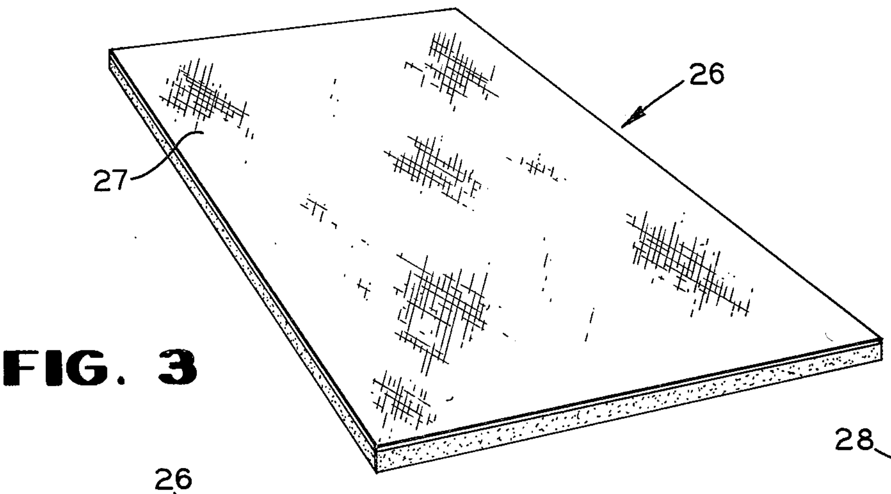
FIG. 3 is a perspective view of a blank or sheet of flexible material to be skived and fabricated into the finished trim part.

With the fixture 14 and its supporting structure set up in this way, the part 10 can be fabricated thereon as illustrated in FIGS. 4 through 10. Thus, as shown at 26 in FIG. 3, there is first provided a relatively heavy, flexible sheet which, for example, may be one inch in thickness, of plastic foam, and that has been die cut or otherwise shaped or made to conform to the outline desired in the finished article. Where plastic foam is used it may be the so-called acoustical foam, or practically any other available commercial foamed plastic sheeting that is both flexible and porous; and it preferably has a decorative face 27 at one surface which will be hereinafter referred to as the face side of the sheet. This face side is characterized by being embossed, or by having a vinyl or other plastic sheet adhered to it which may be plain, embossed, perforated or otherwise rendered decorative.

Figure 4:
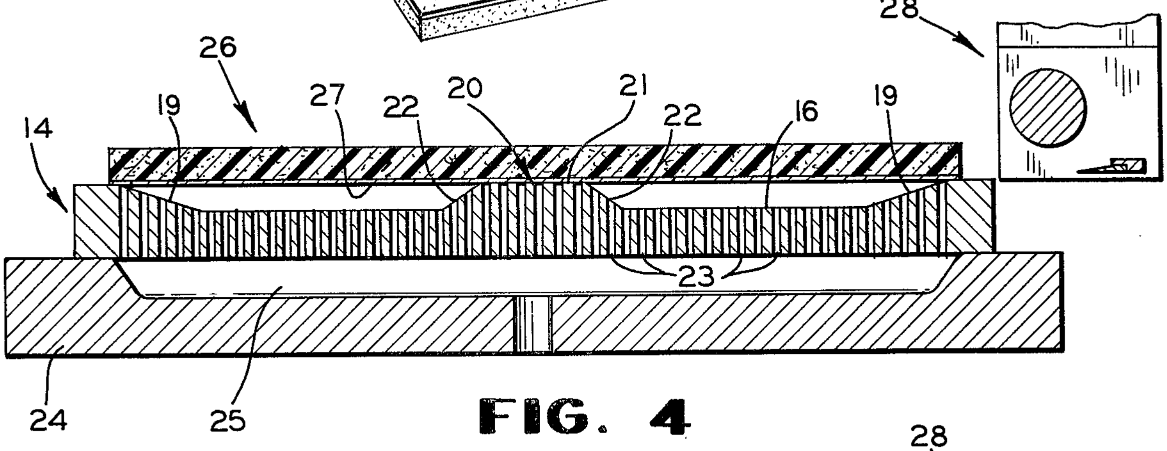
FIG. 4 is a transverse, sectional view, taken substantially along the line 4—4 in FIG. 2, but showing the sheet of FIG. 3 located on the holding fixture preparatory to beginning the skiving procedure.
Figure 5:
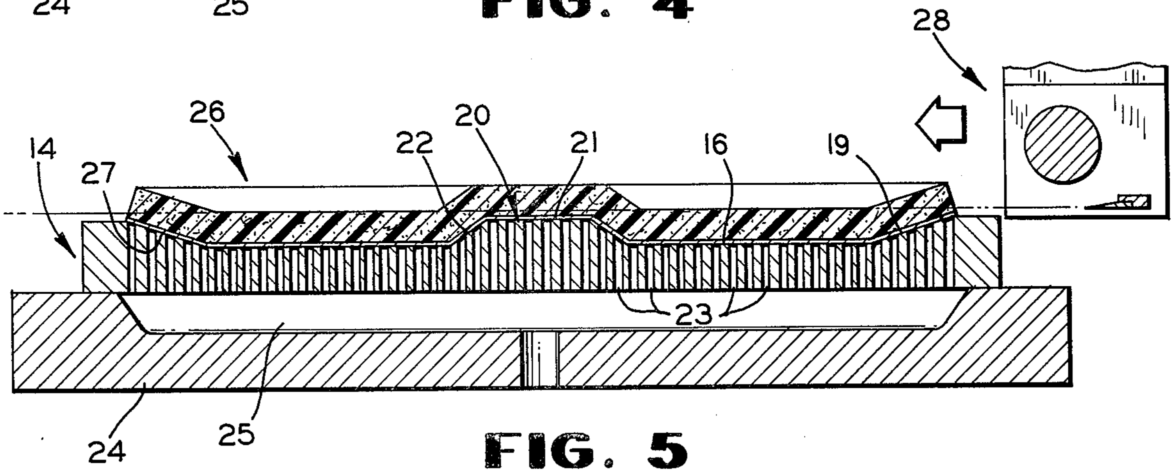
FIGS. 5, 6 and 7 are views similar to FIG. 4, but depicting successive steps in the skiving phase of the complete fabricating procedure.

In any event, however decorated, the sheet 26 of plastic foam to be fabricated into a trim part is first laid over and located on the fixture 14, with its face side down, as shown in FIG. 4. When properly located, the sheet 26 completely covers all areas of the fixture 14 into which the passageways 23 open so that, as air is exhausted through these passageways, a vacuum will be pulled against the entire overlying sheet which will act to deform the sheet and draw it into the depressions in, and into full contact with the bottom 16 and inside walls 19 of, the open box structure of the fixture 14. At the same time, it will act to hold the sheet tightly against the flat top 21 and the side walls 22 of the protrusion 20, all as shown in FIG. 5. The action of the air in deforming the sheet 26 to the necessary extent can be assisted, where necessary or desired, by physical pressure against the upper surface (back side) of the sheet until it is completely conformed to, and is securely and tightly held in full contact with the fixture 14 by air pressure alone.

Figure 6:
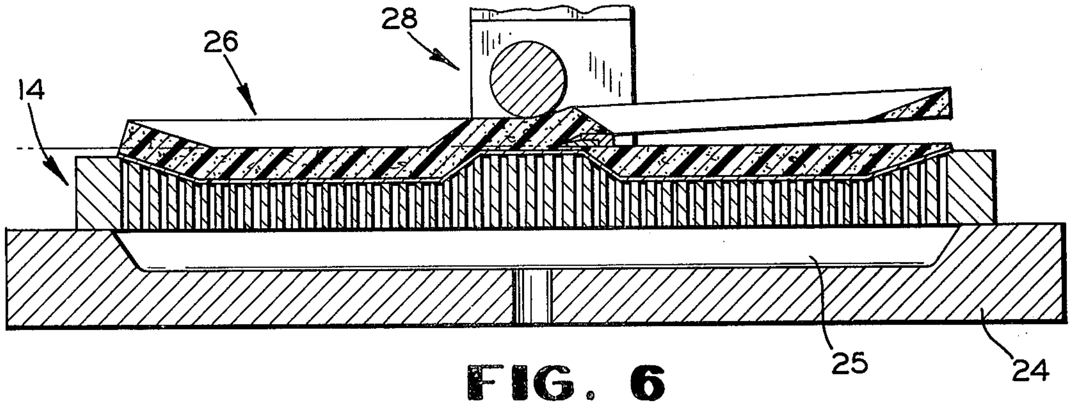
Figure 7:
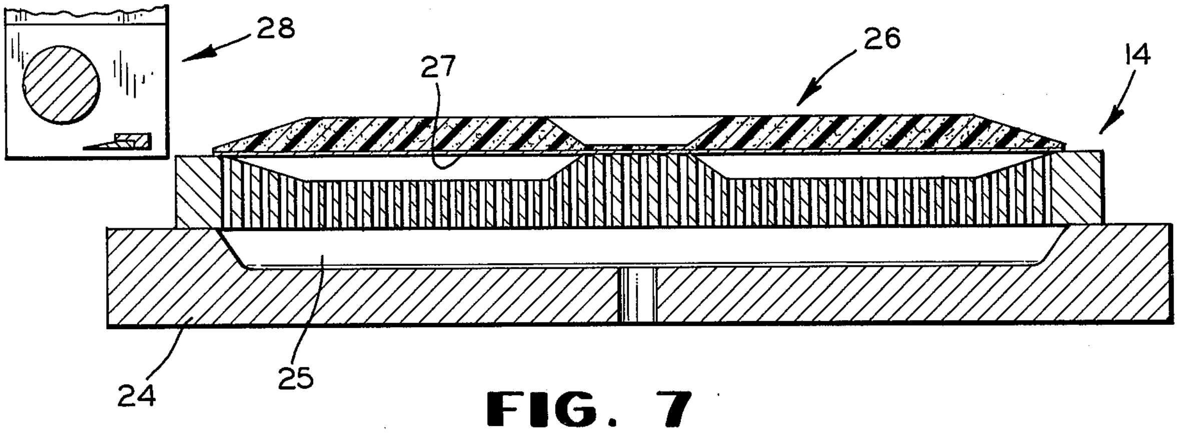
Figure 8:
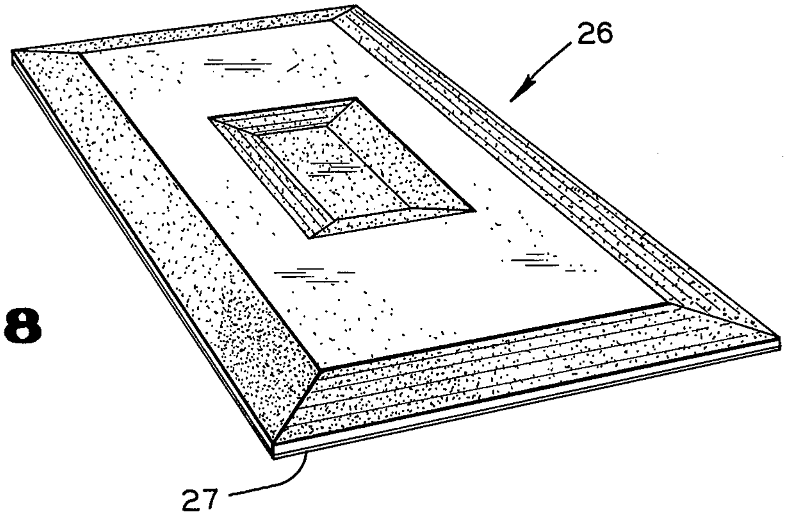
FIG. 8 is a perspective view of the sheet of FIG. 3 after the skiving step has been completed.

With the so deformed sheet 26 held firmly in place on the fixture, a combined roller and blade assembly 28, normally located to one side of the fixture 14 (FIGS. 4 and 5), is moved across the fixture in the direction of the arrow in FIG. 5 to skive or slice off all portions of the sheet 26 that protrude above the plane or line of the op of the fixture 14 from the body portion of the sheet, as illustrated in FIG. 6. Upon completion of the cutting movement of the roller and blade assembly, and release of the vacuum, the roller and blade will be beyond the fixture, and the sheet 26 will return to its natural flat form as shown in FIG. 7. At this time, too, as a result of the skiving, the sheet 26 will exhibit the cut shape shown in FIGS. 7 and 8; and the scrap material removed by the skiving can be used elsewhere as padding, build-up material and the like.

Figure 9:
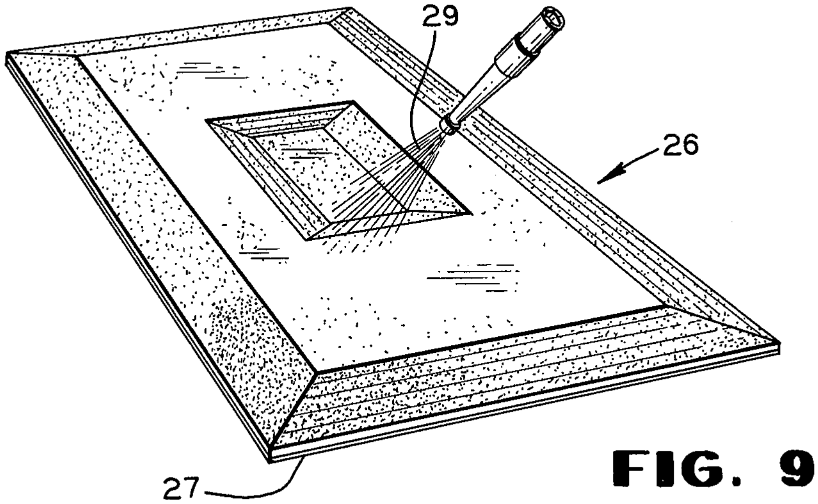
FIG. 9 is a perspective view, showing the application of an adhesive to the skived sheet.

Following the skiving operation, a coating or layer of adhesive 29 is applied to the back or skived side of the sheet 26. This is preferably done by spraying glue or the like uniformly over the surface to be coated as shown in FIG. 9, but it may be brushed on or otherwise applied, either in a separate area away from the fixture 14 as indicated in FIG. 9 or while the skived sheet is still on the fixture as in FIG. 7. If the former procedure is used, the adhesive coated sheet is returned to the fixture so that, in either case, the coated sheet will be positioned on the fixture 14 as shown in broken lines in FIG. 10 for the next or backing step of its fabrication. Thereafter air is again exhausted from the chamber 25 to reapply a vacuum to the glue coated, skived sheet and cause it to return to its FIG. 6 position, as shown in full lines in FIG. 10, and at which time the upper surface or adhesive coated back side of the sheet 26 will be flat.

Figure 10:
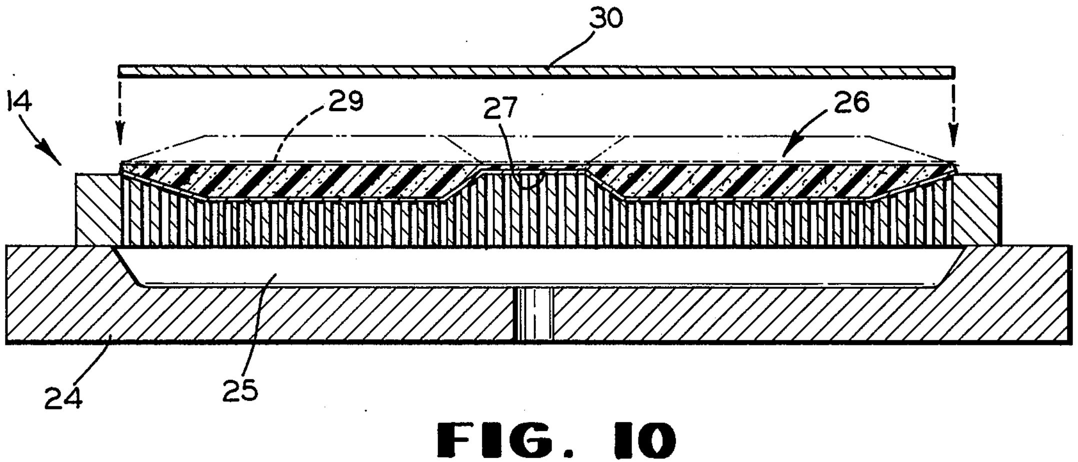
FIGS. 10 and 11 are views similar to FIGS. 4 through 7 but depicting the assembly phase of the fabricating procedure.
Figure 11:
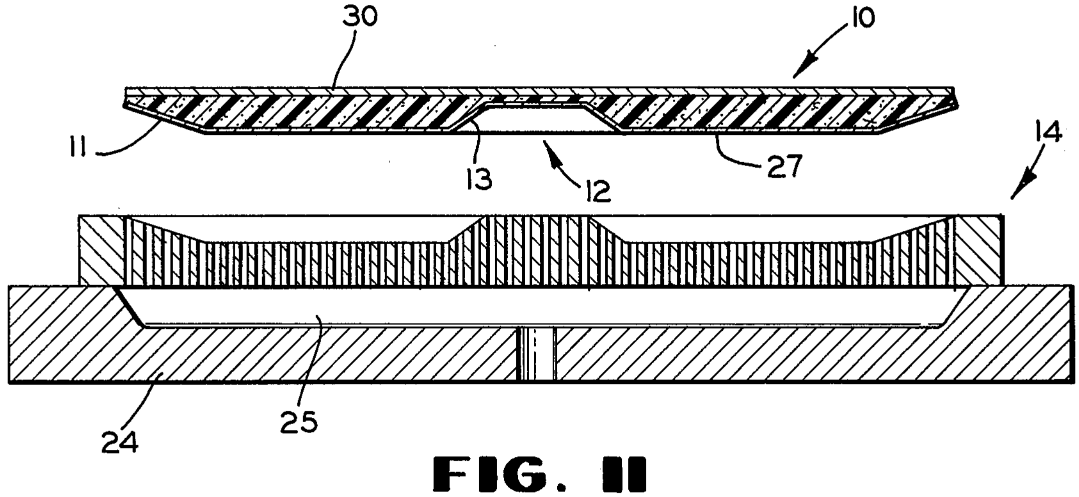

This facilitates application of a foundation board or backing layer to the skived and glue coated sheet 26 to provide the complete and finished trim part desired as the end product. More specifically, a sheet of fiber board or the like 30 that has been die cut or otherwise shaped to the required size is arranged over and then moved downwardly in the direction of the arrows into contact with the adhesive coating 29 on the sheet 26 as indicated in FIG. 10. With the foundation board in contact with or pressed against the adhesive coating, the action of the air being exhausted through the chamber 25 will be to sustain the pressure of the board 30 against the coated sheet 26 and this can be maintained until the adhesive has set and the two are firmly adhered together.

Alternatively, of course, the foundation board may be applied against the adhesive coated sheet before drawing a vacuum and while the sheet 26 is in the broken line position of FIG. 10. In this case when the vacuum is drawn it will serve to more or less simultaneously pull the sheet 26 into the full line position shown and to press the board and coated sheet together.

Figure 12:
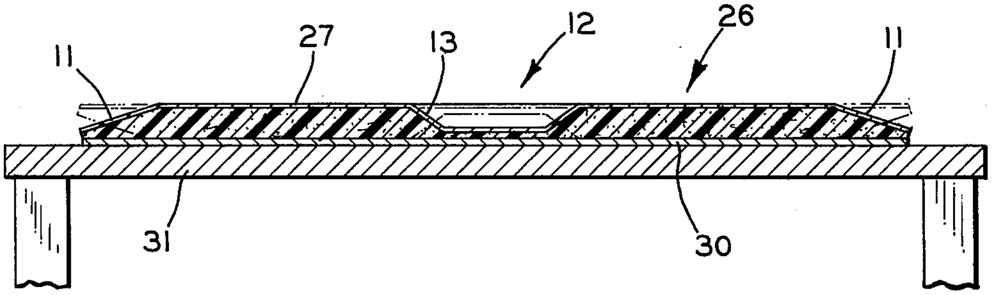
FIG. 12 is a view, showing an alternate type of an assembly procedure.

Also, the skived and glue coated sheet can be assembled with the foundation board without the dual use of the skiving fixture as a holding fixture. Thus, as shown in FIG. 12, with the foundation board 30 resting on a suitable support 31, the skived sheet 26 can be located over, and the central area of its glue coated back side forced down and against, the board and with its face side up. The next step is to force margins of the sheet down to also bring their tapered portions 11 against the foundation board and simultaneously press the board and the entire glue coated side and faces of the sheet together, and to allow the glue to set up.

As a further modification, the sheet 26 may be so deformed, prior to skiving, that portions thereof, such as the central portion 12, can be thinned to a greater or lesser extent, otherwise shaped, or even completely removed during the skiving procedure.

As already indicated, among the advantages of the articles of the invention is the fact that they can be used as bent or curved as well as flat sheets. For example, in automobiles, when employed as hood liners or trunk lids, they serve as insulation, sound deadeners and fire retardants, and can be employed in both flat and bent shapes. Similarly, as crash pads for sun visors, as well as in other locations, they may be hinged or folded upon themselves so as to cover both sides and at least one edge. While, when used as roof liners, they must be so deformable as to fit exactly the contour of the roof and adjacent side wall of the automobile.

Figure 13:
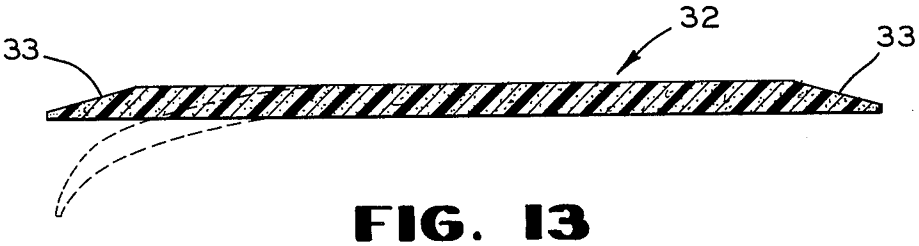
FIG. 13 is a sectional view of a specific form of skived lining and trim part produced in accordance with the invention.
Figure 14:
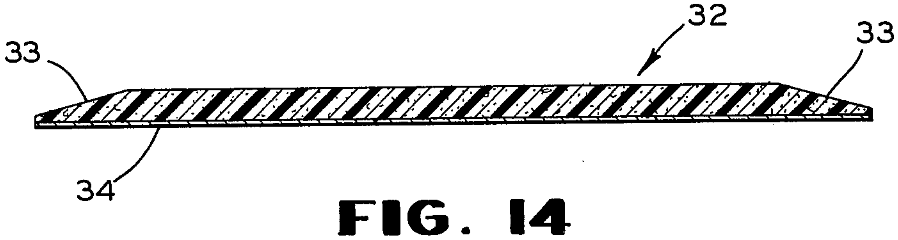
FIG. 14 is a similar view of the part of FIG. 13 provided with a two-way stretch backing therefor.
Figure 15:
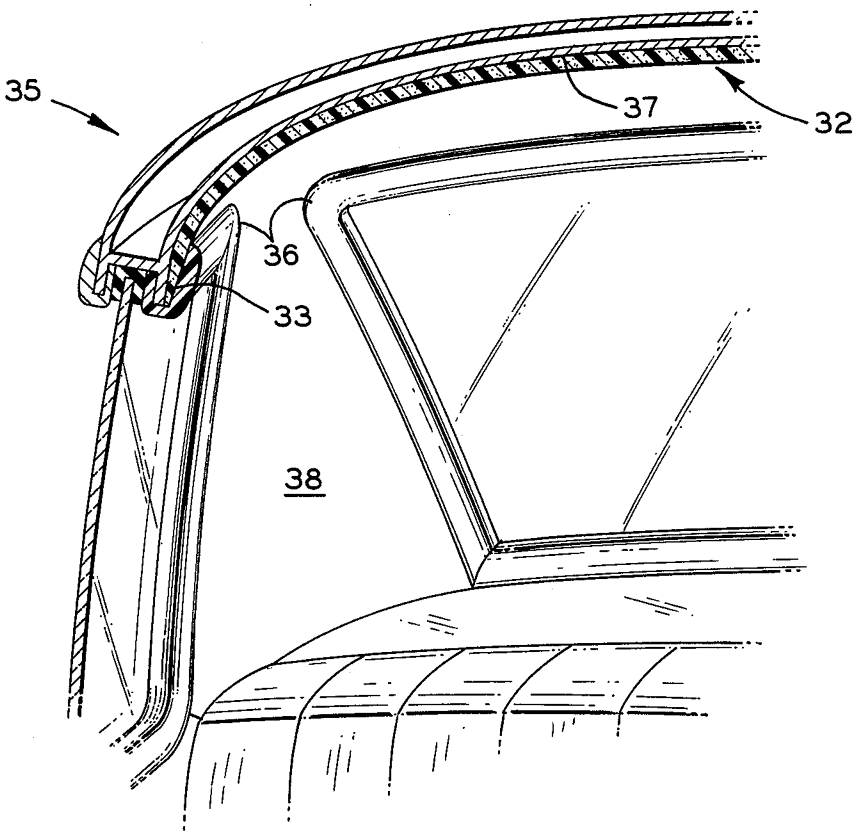
FIG. 15 is a fragmentary view of an interior rear quarter of an automobile with an article such as shown in FIGS. 13 and 14 in use as a roof and side liner part.

Nevertheless, even in the latter instance, the skiving procedure conforms to the method already described, and a flat sheet 32, of the acoustical foam for example, may be produced with edges 33 of reduced thickness as shown in FIG. 13. Preferably, this sheet 32 is then provided with a backing 34 of any of the well known flexible and/or two-way stretch materials available. In any event, the sheet 32, which has preferably been precut to an outline contour conforming with that of a part of the roof and/or wall space to be covered or lined before being skived, is then folded to an extent sufficient to permit it to be introduced through a window or door opening in an automobile 35, an interior rear quarter of which is illustrated in FIG. 15. Inside the car the folded sheet or part 32 is permitted to open, the reduced edge portions 33 are inserted behind the molding or internal trim molding 36, and the body of the sheet is forced into conformity with the interior of the roof 37 and side wall 38 of the car.

It is to be understood that the forms of the invention herein shown and described are to be taken as preferred embodiments only thereof, and that various changes in the size, shape and arrangement of parts, as well as various procedural changes may be resorted to without departing from the spirit of the invention as defined in the following claims.

I claim:

1. A method of fabricating an article, which comprises deforming a flexible sheet to locate selected portions thereof at one side and other portions thereof at the other side of a predetermined line, moving a cutting tool along said line and in cutting engagement with said deformed sheet to remove only said other portions from said sheet, and retaining said cut flexible sheet in said deformed state by securing a backing to the areas of said selected portions of said sheet that were at said one side of said line during the movement of said cutting tool while said cut flexible sheet is in said deformed state.

2. A method as defined in claim 1, in which said sheet is deformed by forcing said selected portions thereof into and retaining the same in depressions in a surface of a holding fixture, said line of movement of said cutting tool is in a plane parallel with said surface, and said backing layer is secured to cut and uncut areas of said sheet that are in said plane parallel with said surface of said fixture while said sheet is being retained in said depressions.

* * * * *